Patented Apr. 6, 1937

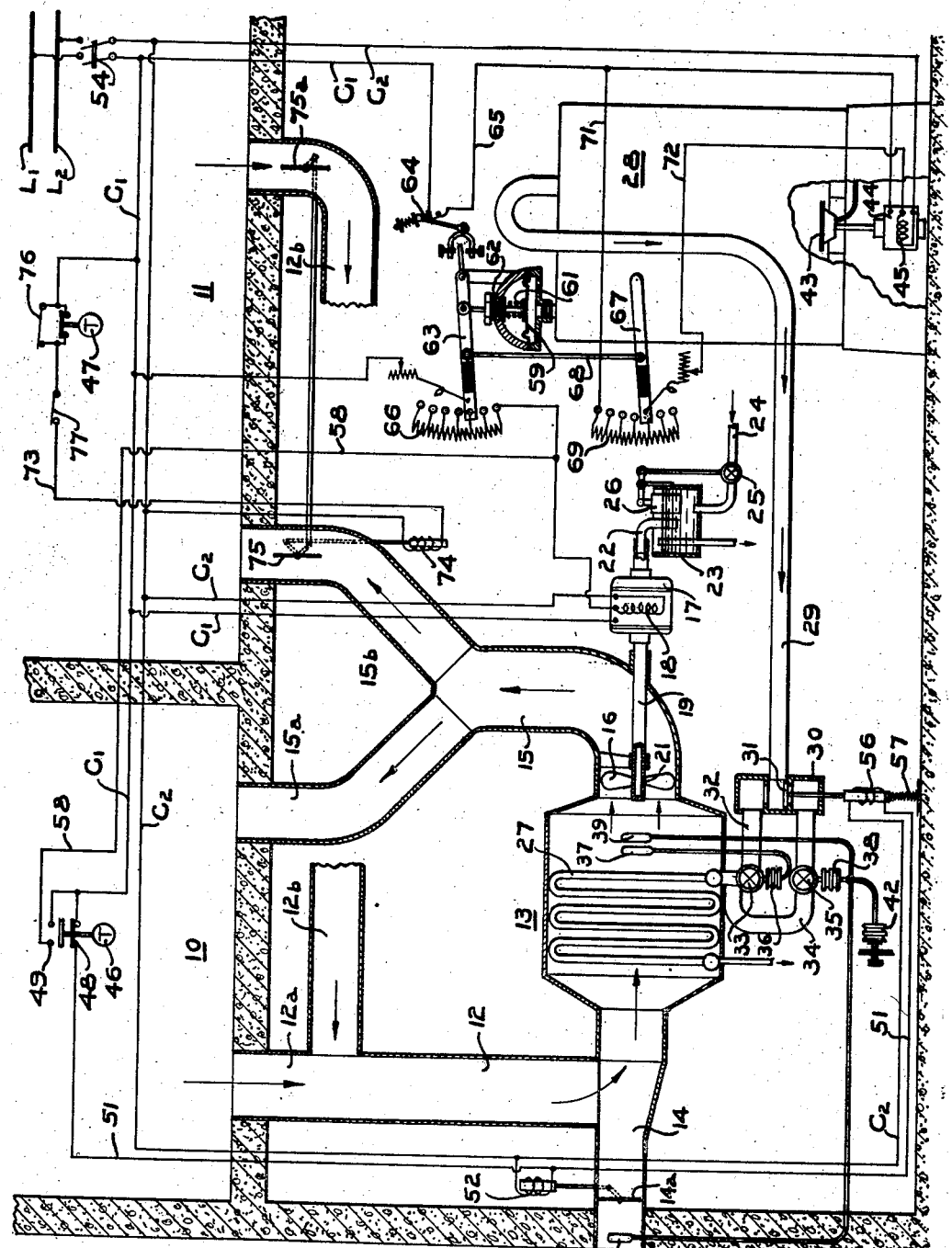

2,076,146

UNITED STATES PATENT OFFICE 2,076,146

CONTROL MECHANISM

Henry D. James, Edgewood, Pa., assignor to Westinghouse Electric & Manufacturing Company, East Pittsburgh, Pa., a corporation of Pennsylvania Application August 9, 1934, Serial No. 739,077

15 Claims. (Cl. 236—1)

My invention relates to control mechanism, more particularly to mechanism for controlling apparatus for heating one or a plurality of enclosures, and it has for an object to provide improved control mechanism.

Another object is to provide mechanism for automatically controlling heating apparatus to provide the desired conditions of temperature and humidity under varying conditions.

A further object is to provide mechanism for controlling heating apparatus including combustion apparatus, which mechanism effects starting and stopping of the combustion apparatus at less frequent intervals.

The above and other objects are effected by my invention as will be apparent from the following description and claims taken in connection with the accompanying drawing, forming a part of this application, in which:

The single figure is a diagrammatic view of the heating apparatus and the control mechanism therefor.

Referring to the drawing in detail, I show enclosures 10 and 11, which may be the living room and a bed room, respectively, of a house to be heated. A duct 12, having branches communicating with the several enclosures, including branches 12a and 12b communicating with the rooms 10 and 11, conveys air from the several enclosures to a heating unit 13. A fresh air duct 14, extending from outdoors to the duct 12 and having a damper 14a therein, provides a supply of fresh or outdoor air. A supply duct 15 conveys the heated air to the several enclosures, the branches communicating with the rooms 10 and 11 being designated 15a and 15b, respectively.

A fan 16, positioned at any suitable point, as in the duct 15, provides circulation of air. It is driven by a motor 17, which is preferably a variable speed motor, having a shunt field winding 18, the current through which is varied to change the speed of the motor and fan. The fan and motor are provided with a hollow rotating shaft 19, and openings 21 are formed therein which operate as a centrifugal pump to direct water into the heated air. One end of the shaft 19 communicates through a stationary pipe 22 with a water receptacle 23. Water is supplied to the receptacle through a pipe 24 having a valve 25 which is controlled by a float 26 to maintain a constant water level.

The heating unit 13 is provided with a suitable heat exchanger for heating the air, such as a steam coil 27 or a bank of steam coils. It is supplied with steam from a steam generator or boiler 28 through a conduit 29. The latter is connected to a distributing valve 30 having a valve member 31, for directing the steam to the steam coil through either a branch conduit 32 having a valve 33 therein or a branch conduit 34 having a valve 35 therein. The valve 33 is actuated by a thermostat 36 including a thermostatic bulb 37 disposed in the path of the heated air leaving the coil 27. The thermostat 36 is designed or adjusted to provide the maximum permissible temperature of heated air. The valve 35 is actuated by a thermostat 38 which includes a bulb 39 also disposed in the path of the heated air, a second thermostatic bulb 41 disposed in the duct 14 and responding to outdoor temperature, and a bellows 42 whereby adjustment of the thermostat is obtained. The bulb 41 compensates for variations in outdoor temperature, serving to effect a higher temperature of heated air when the outside temperature is low, and vice versa.

The steam generator 28 includes combustion apparatus, such as an oil burner of the wall flame type having a spinner 43 driven by a motor 44. The latter is of the variable speed type, having a shunt field winding 45.

The control mechanism for the above described heating and humidifying apparatus includes a thermostat 46 which is located within the room 10 but positioned so as to respond to a temperature representative of the entire group of enclosures served by the apparatus. The thermostat 46 normally controls the heating of the entire group of enclosures, the thermostat 47 in the room 11 being effective only under certain conditions later described.

The thermostat 46 is preferably of the snap-action type. It includes contacts 48 which are closed when the temperature is too low and contacts 49 which are closed when the temperature is sufficiently high. The contacts 48 control a circuit from a conductor $C_1$ through a conductor 51 and a solenoid 52 which operates the fresh air damper 14a, to a conductor $C_2$. The conductors $C_1$ and $C_2$ are connected to line conductors $L_1$ and $L_2$ through a main switch 54 which controls the supply of electric current to the entire control mechanism. The solenoid 52 is arranged to close the damper 14a when energized. The contacts 48 also control a circuit from conductor $C_1$, through the conductor 51 and a solenoid 56 which operates the valve member 31, to conductor $C_2$. When energized, the solenoid 56 is in the position shown, directing the steam through the conduit 32 and the valve 33. When deenergized a spring 57 moves the valve member to the opposite position. The contacts 49 control a circuit from conductor $C_1$ through a conductor 58 and the field winding 18 to the conductor $C_2$, for applying maximum or line voltage to the field winding and effecting minimum speed of the motor 17.

A pressure-responsive device 59 is subjected to the steam pressure in the steam generator 28 and serves to increase the speed of the fan 16 and to decrease the speed of the spinner 43 in response to increase in steam pressure; also to stop and start the combustion apparatus in response to predetermined upper and lower limits of pressure. The pressure responsive element 59 is biased against the steam pressure by a spring 61 having an adjustable spring nut 62 whereby the setting of the spring may be varied. The pressure-responsive device 59 is connected to a lever 63, one end of which operates snap-acting contacts 64 controlling a circuit from conductor $C_1$, through a conductor 65 and the armature of the motor 44 to conductor $C_2$. The other end of the lever 63 operates a variable resistance 66, which is connected between conductors $C_1$ and 58, in parallel with the contacts 49, and which controls the speed of the fan 16 when the contacts 49 are open. A second lever 67 is connected to the lever 63 by a link 68 and operates a resistance 69 in the circuit of the field winding 45 of the motor 44, which circuit extends from conductor $C_1$, through contacts 64, conductor 65, a conductor 71, the resistance 69, a conductor 72, and the field winding 45 to the conductor $C_2$.

The thermostat 47 controls a circuit 73 extending through a solenoid 74 connected to a damper 75 in the branch air duct 15b and a damper 75A in the branch duct 12b, which dampers are open when the circuit is completed and the solenoid energized. A switch 76 is connected in parallel with the thermostat 47 for maintaining the damper open independently of the thermostat 47, and a switch 77 is connected in series for closing the damper independently of the thermostat.

The operation of the above described mechanism is as follows: when the thermostat 46 closes its contacts 48 to indicate a demand for increased delivery of heat, the parts assume the position shown on the drawing. The damper 14a is closed to shut off the supply of fresh air, thereby eliminating temporarily the heating load required to bring the fresh air to the required temperature. The valve member 31 directs the steam through the conduit 32 and the valve 33, the latter regulating the admission of steam to the coil so as to produce the maximum temperature of heated air which is permissible for delivery to the enclosures. The circuit to the field winding 18 of the motor 17 is open at the contacts 49, so that said field winding receives a reduced amount of current through the resistance 66. Due to the decreased field strength, the speed of the motor 17 and the fan 16 is increased and heated air is delivered to the enclosures at a higher rate to satisfy the increased demand.

The speed of the motor 17 and the fan 16 is reduced when the steam pressure in the steam generator 28 decreases, in order to limit the rate at which heat is absorbed from the steam coil 27 to the rate at which the steam generator 28 is supplying heat. Upon decrease in steam pressure, the lever 63 moves downwardly to decrease the resistance and increase the flow of current to the field winding 18, thereby effecting reduced speed. Upon increase in pressure, the lever 63 moves upwardly to interpose greater resistance in effecting higher speeds.

As the steam pressure increases, the lever 67 is also moved upwardly through the lever 63 and the link 68 to decrease the resistance offered by the resistance element 69. The field strength of the winding 45 is thus increased to reduce the speed of the spinner 43, thereby reducing the rate of combustion. The purpose of reducing the rate of combustion is to maintain the oil burner in operation over longer periods of time, causing less annoyance due to the frequent stopping and starting which may occur.

As the steam pressure reaches a predetermined maximum value, the right hand end of the lever 63 opens the contacts 64, thereby stopping the motor 44 and discontinuing operation of the combustion apparatus. When a predetermined minimum pressure is reached, the contacts 64 are reclosed to again start operation of the combustion apparatus. It will be understood that any known combustion apparatus and control therefor may be embodied in the present invention.

As the speed of the fan 16 increases and delivers increased quantity of heated air, the capacity to evaporate water also increases. This is automatically taken care of in the present mechanism in that the higher speed results in increased quantity of water being pumped through the openings 21 into the stream of heated air.

When the desired temperature in the enclosures is reached, the thermostat 46 opens the contacts 48 and closes the contacts 49. The damper 14a is reopened to admit fresh air and the valve member 31 is positioned to direct the steam to the conduit 34 and the valve 35. The admission of steam to the coil 27 is now controlled to maintain a temperature of heated air which varies inversely with the outside temperature, and which is preferably always lower than the temperature maintained by the valve 33. The closing of the contacts 49 short circuits the resistance 66 and applies full line voltage to the field winding 18, causing the fan 16 to be operated at minimum speed. The steam generator 28 continues in operation, being controlled by the steam pressure as before, but supplies reduced quantity of steam.

Under certain conditions it may be desirable to maintain a lower temperature in the room 11, as at night, thereby reducing the heating load. For example, it may be desired to maintain 70° in the room 10 and 60° in the room 11. In this event, the switch 76 is opened, thereby placing the damper 75 under control of the thermostat 47. When the temperature within the room 11 is above 60°, the damper 75 is closed to shut off the admission of heated air to the room 11. When the temperature is below 60°, the thermostat 47 closes its contacts to open the dampers 75 and 75A and heated air is admitted to the room 11. In this case, the rate of delivery of heated air is determined by the thermostat 46. Should it be desired to limit the delivery of heat to a limited number of rooms, for example, to the room 10, the switch 77 is opened to close the damper 75 independently of the action of the thermostat 47.

I claim as my invention:

1. In heating apparatus for heating an enclosure, the combination of heating means, means for circulating air for the enclosure in heat-exchanging relation with said heating means, a first means for controlling the supply of heating medium to said heating means in response to both the temperature of the heated air and the outside temperature, a second means for controlling the supply of heating medium to said heating means in response to the temperature of the heated air independently of the outside temperature, and means for increasing the rate of circulation of air being heated and for rendering said first means inoperative and said second means operative in response to increased demand for heating.

2. In heating apparatus for heating an enclosure, the combination of heating means, means for circulating air for the enclosure in heat-exchanging relation with said heating means, a first means for controlling the supply of heating medium to said heating means in response to both the temperature of the heated air and the outside temperature, a second means for controlling the supply of heating medium to said heating means in response to the temperature of the heated air independently of the outside temperature, and means for rendering said first means inoperative and said second means operative in response to increased demand for heating.

3. In heating apparatus for heating an enclosure, the combination of heating means, means for circulating air for the enclosure in heat exchanging relation with said heating means, means for reducing the supply of heating medium in response to increase in outside temperature, and means for rendering the last-mentioned means operative in response to decreased demand for heating and inoperative in response to increased demand for heating.

4. In heating apparatus for an enclosure, the combination of means for delivering heat to the enclosure, thermostatic means movable to a first position in response to temperature desired to be maintained in said enclosure and to a second position in response to a lower temperature indicating demand for heating, and means responsive to movement of said thermostatic means to said first position for varying the rate of heat delivery to said enclosure in accordance with outdoor temperature, and responsive to movement of said thermostatic means to said second position for effecting an increased rate of heat delivery to the enclosure that is independent of the outdoor temperature.

5. In heating apparatus for heating an enclosure, the combination of heating means, means for circulating air for the enclosure in heat-exchanging relation with said heating means, means for adding outdoor air to the circulated air, a first means for controlling the supply of heating medium to said heating means in response to the temperature of the heated air and in response to the outdoor temperature, a second means for controlling the supply of heating medium to said heating means in response to the temperature of the heated air, and for increasing the circulation of air being heated, for discontinuing the addition of outdoor air, and for rendering said first means inoperative and said second means operative in response to increased demand for heating.

6. In heating apparatus for an enclosure, the combination of a heat exchanger for heating air for said enclosure, a steam generator for supplying steam to said heat exchanger, a combustion unit for supplying heat to said steam generator, and means for initiating operation of said combustion unit in response to decrease in steam pressure in said steam generator below a predetermined lower limit, for discontinuing operation thereof in response to a predetermined upper limit, and for decreasing the rate of combustion in response to increase in steam pressure between said limits.

7. In heating apparatus for an enclosure, the combination of a heat exchanger, means for circulating air in exchanging relation with said heat exchanger and to said enclosure, a steam generator for supplying steam to said heat exchanger, a combustion unit for supplying heat to said steam generator, and means for initiating operation of said combustion unit in response to decrease in steam pressure in said steam generator below a predetermined lower limit, for discontinuing operation thereof in response to a predetermined upper limit, and for increasing the rate of combustion in response to decrease in steam pressure and decreasing the same in response to increase in steam pressure between said limits.

8. In heating apparatus for an enclosure, the combination of a heat exchanger for heating air for said enclosure, a steam generator for supplying steam to said heat exchanger, a combustion unit for supplying heat to said steam generator, and means for initiating operation of said combustion unit in response to decrease in steam pressure in said steam generator below a predetermined lower limit, for discontinuing operation thereof in response to a predetermined upper limit, and for increasing the rate of combustion in response to decrease in steam pressure and decreasing the same in response to increase in steam pressure between said limits.

9. In apparatus for heating an enclosure, the combination of a heat exchanger, means for circulating air for the enclosure in heat-exchanging relation with said heat exchanger, a steam generator for supplying steam to said heat exchanger, a combustion unit for said steam generator, and means responsive to increase in steam pressure in said steam generator for increasing the rate of said air circulation and for decreasing the rate of combustion, and responsive to decrease in steam pressure for decreasing the rate of said air circulation and for increasing the rate of combustion.

10. In heating apparatus for heating an enclosure, the combination of heating means, means for circulating air for the enclosure in heat-exchanging relation to said heating means, a first means responsive to an internal temperature within said enclosure for increasing the heat of said heating means when said internal temperature is too low, and a second means operative when said internal temperature is satisfactory, as judged by said first means, for controlling the heat of said heating means in response to both the temperature of the heated air and the outside temperature.

11. In heating apparatus for heating an enclosure, the combination of heating means, means for circulating air for the enclosure in heat-exchanging relation to said heating means, means operative for controlling the heat of said heating means in response to both the temperature of the heated air and the outside temperature, and means responsive to an internal temperature within said enclosure for increasing the rate of circulation of the circulated air when said internal temperature is too low.

12. In heating apparatus for heating an enclosure, the combination of heating means, means for circulating air for the enclosure in heat-exchanging relation to said heating means, means for admitting outside air, means operative for controlling the heat of said heating means in response to both the temperature of the heated air and the outside temperature, and means responsive to an internal temperature within said enclosure for reducing the admission of outside air when said internal temperature is too low.

13. In heating apparatus for heating an enclosure, the combination of heating means, means for circulating air for the enclosure in heat-exchanging relation to said heating means, means for admitting outside air, means operative for controlling the heat of said heating means in response to both the temperature of the heated air and the outside temperature, and means responsive to an internal temperature within said enclosure for increasing the heat of said heating means, increasing the rate of circulation of said circulated air and reducing the admission of outside air, when said internal temperature is too low.

14. In heating apparatus for heating a house, the combination of heating means, means for circulating air for the house in heat-exchanging relation to said heating means, a first means responsive to an internal temperature within said house for increasing the heat of said heating means when said internal temperature is below a predetermined value, and a second means operative when said first means does not call for increased heat, for controlling the temperature of the heated air in some predetermined relation to outside weather conditions.

15. In heating apparatus for heating an enclosure, the combination of fuel-combustion means, a source of fuel-supply therefor, means for circulating a heat-exchanging medium therethrough, means for circulating air for the enclosure in heat-exhanging relation to said heat-exchanging medium, means responsive to a condition which varies with the temperature of said heat-exchanging medium for gradually reducing said fuel-supply in a plurality of steps as said temperature approaches a predetermined maximum value, and means responsive to a condition which varies with the temperature of said heat-exchanging medium for controlling the rate of circulation of said air.

HENRY D. JAMES.